March 30, 1965 G. E. MARQUART ETAL 3,175,305

SIMULATED BIBLE BOOK

Filed July 22, 1963

INVENTORS
GAIL E. MARQUART
HELEN L. MARQUART
BY
Dick, Zarley + Henderson
ATTORNEYS

United States Patent Office 3,175,305
Patented Mar. 30, 1965

3,175,305
SIMULATED BIBLE BOOK
Gail E. Marquart and Helen L. Marquart, both of 215 Glenview, Des Moines, Iowa
Filed July 22, 1963, Ser. No. 296,739
8 Claims. (Cl. 35—23)

This invention relates to a simulated bible and particularly to a book case in the shape of a bible book for holding individual hollow book units corresponding to the books of the bible.

Children and adults too, frequently find the study of the bible overwhelmingly difficult. This is true even to the extent of remembering the names of the individual books in the bible. Accordingly, it is more difficult to remember even in brief summary form the contents of each book. The scope and comprehensiveness of the bible is readily appreciated when the size of the bible is considered. There are 66 individual books in the Protestant bible and six more or a total of 72 in the Catholic bible.

Therefore, it is an object of this invention to provide in physical form a structural combination symbolic of the bible and each of its individual books which will aid a student in studying and remembering at least in summary form the contents of the bible.

It is a further object of this invention to provide in structural form an aid for the bible student in learning the order or sequence of the books of the bible.

It is a further object of this invention to provide a simulated bible which serves as a book case for hollow units which simulate the individual books of the bible, which may contain note paper for recording the student's impressions as he reads each book.

It is a further object of this invention to provide a book case, which is portable and in its closed condition has the inherent capability of preventing the books from being dislocated within the book case.

A further object of this invention is to provide a simulated bible book which is simple in design, economical to manufacture and refined in appearance.

These and other objects, and other features and advantages of this invention will become readily apparent upon reference to the following description when taken in conjunction with the accompanying drawings, wherein.

Figure 1:
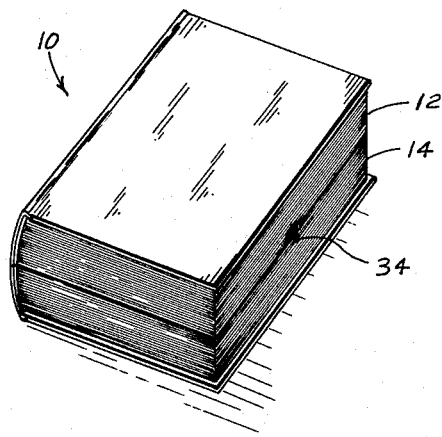
FIG. 1 is a perspective view of the simulated bible-book case in its closed position.
Figure 2:
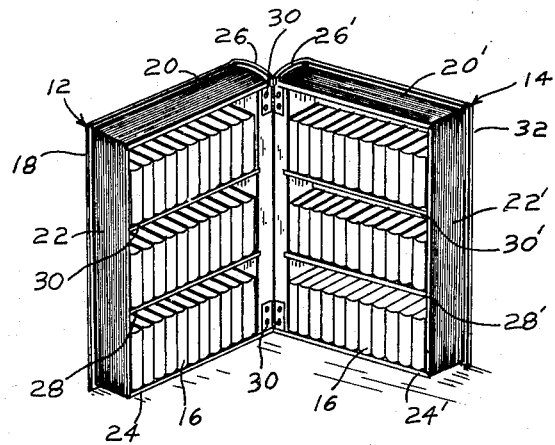
FIG. 2 is a perspective view of the simulated bible-book case in its open upstanding position and in particular showing each of the 66 books of the bible positioned within the bible-book case.
Figure 5:
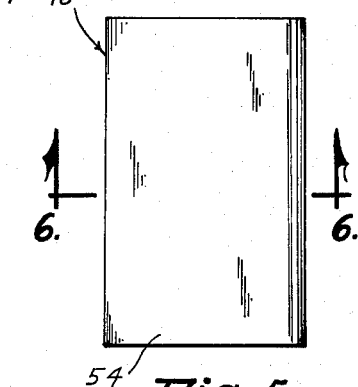
FIG. 5 is a side elevation view of an individual simulated book of the bible including its outside cover.

In FIG. 1 the simulated bible-book case is referred to generally by the reference numeral 10. In FIG. 2 it is shown to include a pair of hinged together sections 12 and 14 forming a book case for holding the simulated books of the bible referred to by the reference numeral 16. The section 12 has a base side 18 which serves as the cover of the book 10. Four side walls 20, 22, 24 and 26 are provided on the base 18. The top, front and bottom walls 20, 22 and 24 respectively have longitudinal grooves formed in their outer faces to simulate the pages of a bible. The inside face of wall 24 serves as a shelf below shelves 28 and 30 which extend above and between the front side wall 22 and the rear side wall 26.

The section 14 is hingedly connected to section 12 by hinges 30 and is similar to section 12 although its base side 32 serves as a back to the book opposite the base side 18 of the section 12. The side walls and shelves of the section 14 are similar to those of section 12 and are thus referred to by similar reference numerals but with the addition of a prime. As shown in FIG. 1, latch 34 is connected to each of the front side wall sections 22 and 22' to lockingly secure the sections 12 and 14 in a folded closed condition whereby an enclosed container is formed therebetween.

As shown in FIG. 2 the simulated bible-book case is provided with 66 simulated books 16 of the bible. Each of the simulated book units 16 are molded of plastic material forming sides 36 and 38 for the front and back covers of the books and ends 40, 42 and 44 for the top, back and bottom portions respectively. By this construction a compartment 45 is formed in the book units 16. Longitudinal channels or grooves 46 (FIG. 6) are formed along the forward inside edges of the sides 36 and 38 to receive the side edges of a front end portion 48. The top portion 40 extends across the ends of the grooves and thereby limits the travel upwardly of the front end portion 48 in the grooves 46. A half moon recess 50 is formed in the outside lower surface of the front end portion 48. Thus, means is provided by the half moon recess 50 to grip the front end portion 48 to move it between open and closed positions whereby in the former position, access to the compartment 45 is made possible. Longitudinal grooves 52 are formed in the top, bottom and front end portions 40, 44 and 48 respectively to simulate the pages of a miniature book.

Figure 4:
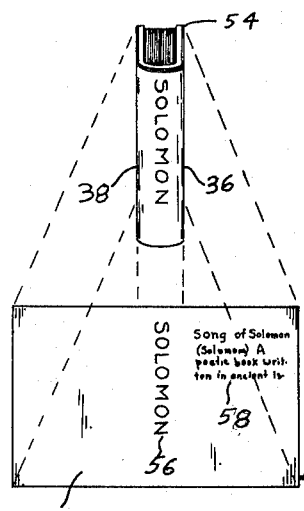
FIG. 4 is an exploded view of an individual simulated book of the bible showing in particular the covering applied to the outside surface thereof.
Figure 3:
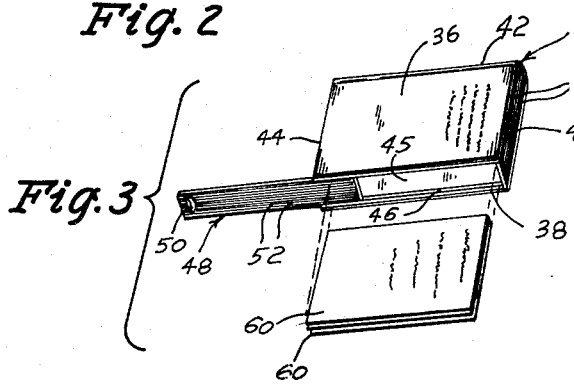
FIG. 3 is a perspective view of one of the simulated books of the bible showing in particular the front edge portion of the unit partially open to receive note-type paper.
Figure 6:
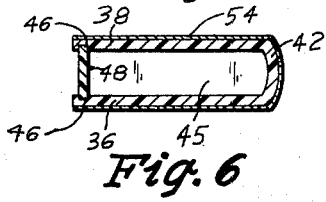
FIG. 6 is a cross-sectional view taken along lines 6—6 in FIG. 5 of an individual simulated book of the bible.

As seen in FIGS. 4 and 6, a paper or cardboard cover 54 is wrapped around the book 16 along its sides 36 and 38 and the back portion 42. Adhesive glue or the like may be used as a securing means. As illustrated in FIG. 4, each of the covers 54 are provided with a title 56 such as Solomon and a synopsis 58 of the book on the front cover portion. In each of the compartments 45, note type papers 60 are provided as shown in FIG. 3.

Thus it is seen that in use, the simulated bible-book case 10 is completely filled with simulated books of the bible 16, one book unit for each of the 66 books of the bible. If a Catholic bible-book case is desired, each of the shelves 28, 30, 28' and 30' may be constructed to accommodate 12 books rather than 11, as shown in FIG. 2. When the sections 12 and 14 are closed, as shown in FIG. 1, the back portions 42 of each of the book units 16 abut against each other on each of the vertically adjacent shelves 24 and 24', 28 and 28', and 30 and 30'. By this arrangement the books are positively held in their proper places within the book case.

The covers 54 for the individual book units 16 may be provided in sheet form for the child to cut out and secure to the outside of the book units 16. This will bring to the attention of the child the name of the book and a summary of its contents. After the child has read a given book of the bible he may note his impressions or verses that he particularly liked on the note papers 60 and place them in the compartment 45 for future reference. The front end portion 48 is easily slid to an open position within the grooves 46 in the front and back side walls 36 and 38 of the book unit 16 to give access to the compartment 45. To facilitate learning the order or sequence of the books of the bible they may be removed from the bible-book case 10 and then replaced in their proper order.

Some changes may be made in the construction and arrangement of our simulated bible book without departing from the real spirit and purpose of our invention, and it is our intention to cover by our claims, any modified forms of structure or use of mechanical equivalents which may be reasonably included within their scope.

We claim:

1. A simulated bible book, comprising,
a pair of sections each having four side walls and a base wall, said sections being hingedly connected together along one side for closing said sections upon each other with said base walls disposed in parallel spaced relationship on the outside of said sections respectively to form an enclosed storage container in the shape of a bible book;
at least one shelf provided in each section extending between a pair of opposite side walls;
a plurality of book units each having a pair of side walls and four end walls to form an enclosed compartment, one of said end walls being movable relative to said side walls to provide an access opening into said compartment, each of said units being in the shape of a miniature book and corresponding to a book of the bible, and each of said units being movably disposed on one of said shelves; and
a means for locking said sections in a closed position relative to each other.

2. A simulated bible book, comprising,
a pair of sections each having four side walls and a base wall, said sections being hingedly connected together along one side for closing said sections upon each other with said base walls disposed in parallel spaced relationship on the outside of said sections respectively to form an enclosed storage container in the shape of a bible book;
at least one shelf provided in each section extending between a pair of opposite side walls;
a plurality of book units each having a pair of side walls and four end walls to form an enclosed compartment, one of said end walls being movable relative to said side walls to provide an access opening into said compartment, each of said units being in the shape of a miniature book and corresponding to a book of the bible, and each of said units being movably disposed on one of said shelves;
note papers provided in each of said book units for recording and storing information concerning the corresponding book of the bible; and
a means for locking said sections in a closed position relative to each other.

3. A simulated bible book, comprising,
a pair of sections each having four side walls and a base wall, said sections being hingedly connected together along one side for closing said sections upon each other with said base walls disposed in parallel spaced relationship on the outside of said sections respectively to form an enclosed storage container in the shape of a bible book;
at least one shelf provided in each section extending between a pair of opposite side walls;
a plurality of book units consisting of the total number of books of the bible indicated by the storage container bible book, each of said book units having a pair of side walls and four end walls to form an enclosed compartment, one of said end walls being movable relative to said side walls to provide an access opening into said compartment, each of said units being in the shape of a miniature book and corresponding to a book of the bible, and each of said units being movably disposed on one of said shelves; and
a means for locking said sections in a closed position relative to each other.

4. A simulated bible book, comprising,
a pair of sections each having four side walls and a base wall, said sections being hingedly connected together along one side for closing said sections upon each other with said base walls disposed in parallel spaced relationship on the outside of said sections respectively to form an enclosed storage container in the shape of a bible book;
at least one shelf provided in each section extending between a pair of opposite side walls;
a plurality of book units each having a pair of side walls and four end walls to form an enclosed compartment, said pair of side walls each having facing adjacent grooves along one inside edge, one of said end walls being slidably disposed with its edges in mating engagement with said grooves to provide an access opening into said compartment, each of said units being in the shape of a miniature book and corresponding to a book of the bible, and each of said units being movably disposed on one of said shelves; and
a means for locking said sections in a closed position relative to each other.

5. A simulated bible book, comprising,
a pair of sections each having four side walls and a base wall, said sections being hingedly connected together along one side for closing said sections upon each other with said base walls disposed in parallel spaced relationship on the outside of said sections respectively to form an enclosed storage container in the shape of a bible book;
at least one shelf provided in each section extending between a pair of opposite side walls;
a plurality of book units each having a pair of side walls and four end walls to form an enclosed compartment, said pair of side walls each having facing adjacent grooves along one inside edge, one of said end walls being slidably disposed with its side edges in mating engagement with said grooves to provide an access opening into said compartment, a second one of said end walls serving as a stop means for said first end wall to abut against when in a retracted position closing said compartment and thereby limiting said sliding movement of said first wall, and each of said units being in the shape of a miniature book and corresponding to a book of the bible, and each of said units being movably disposed on one of said shelves; and
a means for locking said sections in a closed position relative to each other.

6. A simulated bible book, comprising,
a pair of sections each having four side walls and a base wall, said sections being hingedly connected together along one side for closing said sections upon each other with said base walls disposed in parallel spaced relationship on the outside of said sections respectively to form an enclosed storage container in the shape of a bible book;
at least one shelf provided in each section extending between a pair of opposite side walls;
a plurality of book units each having a pair of side walls and four end walls to form an enclosed compartment, said pair of side walls each having facing adjacent grooves along one inside edge, one of said end walls being slidably disposed with its side edges in mating engagement with said grooves to provide an access opening into said compartment, a second one of said end walls serving as a stop means for said first end wall to abut against when in a retracted position closing said compartment and thereby limiting said sliding movement of said first wall, and each of said units being in the shape of a miniature book and corresponding to a book of the bible and each of said units being movably disposed on one of said shelves;
paper sheet material covering and enclosing the outside surface of the side walls and one end wall of said book units, said sheet material having visible indicia for indicating the enclosed book of the bible;
adhesive means for securing said sheet material to said book units; and a means for locking said sections in a closed position relative to each other.

7. A simulated bible book, comprising, a pair of sections each having four side walls and a base wall, said sections being hingedly connected together along one side for closing said sections upon each other with said base walls disposed in parallel spaced relationship on the outside of said sections respectively to form an enclosed storage container in the shape of a bible book;

at least one shelf provided in each section extending between a pair of opposite side walls;

a plurality of book units each having a pair of side walls and four end walls to form an enclosed compartment, said pair of side walls each having facing adjacent grooves along one inside edge, one of said end walls being slidably disposed with its side edges in mating engagement with said grooves to provide an access opening into said compartment, the outer surface of said first end wall having a recess to be engaged by a person's finger when opening and closing said compartment, a second one of said end walls serving as a stop means for said first end wall to abut against when in a retracted position closing said compartment and thereby limiting said sliding movement of said first wall, and each of said units being in the shape of a miniature book and corresponding to a book of the bible, and each of said units being movably disposed on one of said shelves; and a means for locking said sections in a closed position relative to each other.

8. A simulated bible book, comprising, a pair of sections each having four side walls and a base wall, said sections being hingedly connected together along one side for closing said sections upon each other with said base walls disposed in parallel spaced relationship on the outside of said sections respectively to form an enclosed storage container in the shape of a bible book, the end walls extending along the front, top and bottom of said sections each having a plurality of longitudinal grooves to simulate the pages of the bible book;

at least one shelf provided in each section extending between a pair of opposite side walls;

a plurality of book units each having a pair of side walls and four end walls to form an enclosed compartment, said pair of side walls each having facing adjacent grooves along one inside edge, one of said end walls being slidably disposed with its side edges in mating engagement with said grooves to provide an access opening into said compartment, a second one of said end walls serving as a stop means for said first end wall to abut against when in a retracted position closing said compartment and thereby limiting said sliding movement of said first wall, said end walls extending along the top, front and bottom of said book units each having a plurality of longitudinal grooves to simulate the pages of a bible book, and each of said units being in the shape of a miniature book and corresponding to a book of the bible, and each of said units being movably disposed on one of said shelves; and a means for locking said sections in a closed position relative to each other.

References Cited by the Examiner
UNITED STATES PATENTS

| | | | |
|---|---|---|---|
| 273,408 | 3/83 | Voltz | 312—200 |
| 358,450 | 3/87 | Hurlbut | 220—41 |
| 640,315 | 1/00 | Parmelle | 312—199 X |
| 980,234 | 1/11 | Field | 129—43 |
| 1,262,269 | 4/18 | Scherer | 35—23 |
| 1,876,779 | 9/32 | Smith | 312—204 X |

FRANK B. SHERRY, *Primary Examiner.*

CHANCELLOR E. HARRIS, *Examiner.*